United States Patent
Hrabak et al.

(10) Patent No.: US 10,430,603 B2
(45) Date of Patent: Oct. 1, 2019

(54) SYSTEMS AND PROCESSES FOR MANAGING ACCESS TO VEHICLE DATA

(71) Applicant: GM Global Technology Operations LLC, Detroit, MI (US)

(72) Inventors: Robert A. Hrabak, Birmingham, MI (US); Fan Bai, Ann Harbor, MI (US); Jinzhu Chen, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 165 days.

(21) Appl. No.: 15/444,440

(22) Filed: Feb. 28, 2017

(65) Prior Publication Data

US 2018/0247067 A1 Aug. 30, 2018

(51) Int. Cl.
*G06F 21/62* (2013.01)
*G06F 21/85* (2013.01)
*H04L 29/08* (2006.01)

(52) U.S. Cl.
CPC .......... *G06F 21/6218* (2013.01); *G06F 21/85* (2013.01); *G06F 2221/032* (2013.01); *H04L 67/12* (2013.01); *H04L 67/18* (2013.01); *H04L 67/303* (2013.01)

(58) Field of Classification Search
CPC ....... H04L 67/12; H04L 67/04; H04L 67/125; H04L 63/10; H04L 47/803; H04L 41/0813; H04L 41/0816; H04L 41/085; H04L 41/509; H04L 41/0803; H04L 41/083; H04L 41/0853; H04L 41/0869; H04L 41/5025; G06F 21/30; G06F 21/44; G06F 2221/2141; H04W 12/08
See application file for complete search history.

(56) References Cited

U.S. PATENT DOCUMENTS

| 2002/0073238 | A1* | 6/2002 | Doron | H04L 29/06 709/246 |
| 2005/0111468 | A1* | 5/2005 | Kuz | H04L 63/10 370/401 |
| 2005/0131585 | A1* | 6/2005 | Luskin | H04L 67/34 701/1 |
| 2008/0219274 | A1* | 9/2008 | Kato | H04L 12/4625 370/401 |

(Continued)

*Primary Examiner* — Tae K Kim
(74) *Attorney, Agent, or Firm* — Reising Ethington P.C.

(57) ABSTRACT

A gateway apparatus for managing local-device access to vehicle data, including an input/output component for receiving requests for vehicle data from a local device and sending vehicle data to the local device. The apparatus also includes a tangible processing unit in communication with the input/output component and the input/output component, and a non-transitory computer-readable storage device. An access unit of the apparatus has access-unit code that receives, by way of the input/output component, a request for the vehicle data from a local device and determines whether the gateway apparatus may satisfy the request. A control unit has control-unit code that, when executed by the processing unit, determines what vehicle data will be provided. A data unit has data-unit code that prepares the vehicle data to be provided to the local device, and sends the vehicle data to the local device by way of the input/output component.

17 Claims, 5 Drawing Sheets

(56) References Cited

U.S. PATENT DOCUMENTS

| | | | |
|---|---|---|---|
| 2011/0257973 A1* | 10/2011 | Chutorash | G01C 21/3661 704/235 |
| 2012/0033586 A1* | 2/2012 | Jefremov | H04L 43/0894 370/260 |
| 2012/0204166 A1* | 8/2012 | Ichihara | G08G 1/096716 717/168 |
| 2012/0221215 A1* | 8/2012 | Sugiyama | G01C 21/3469 701/51 |
| 2012/0307836 A1* | 12/2012 | Ishigooka | H04L 12/4625 370/401 |
| 2013/0017816 A1* | 1/2013 | Talty | H04W 76/14 455/418 |
| 2013/0124009 A1* | 5/2013 | Esler | H04L 67/303 701/2 |
| 2013/0166778 A1* | 6/2013 | Ishigooka | H04L 12/4035 709/248 |
| 2015/0051787 A1* | 2/2015 | Doughty | G07C 5/008 701/31.5 |
| 2015/0121457 A1* | 4/2015 | Schwarz | G06F 3/0484 726/3 |
| 2015/0151769 A1* | 6/2015 | DeSanzo | B61L 27/00 701/70 |
| 2015/0245181 A1* | 8/2015 | Bai | H04L 67/12 455/414.1 |
| 2015/0381441 A1* | 12/2015 | Schalke | H04L 43/06 709/224 |
| 2016/0050114 A1* | 2/2016 | John Archibald | G06F 1/3206 370/254 |
| 2017/0001649 A1* | 1/2017 | Dickow | H04W 12/08 |
| 2017/0086241 A1* | 3/2017 | Lopes | H04L 12/4641 |
| 2017/0195459 A1* | 7/2017 | e Costa | H04L 67/34 |
| 2017/0206238 A1* | 7/2017 | Coutinho | H04W 4/70 |

* cited by examiner

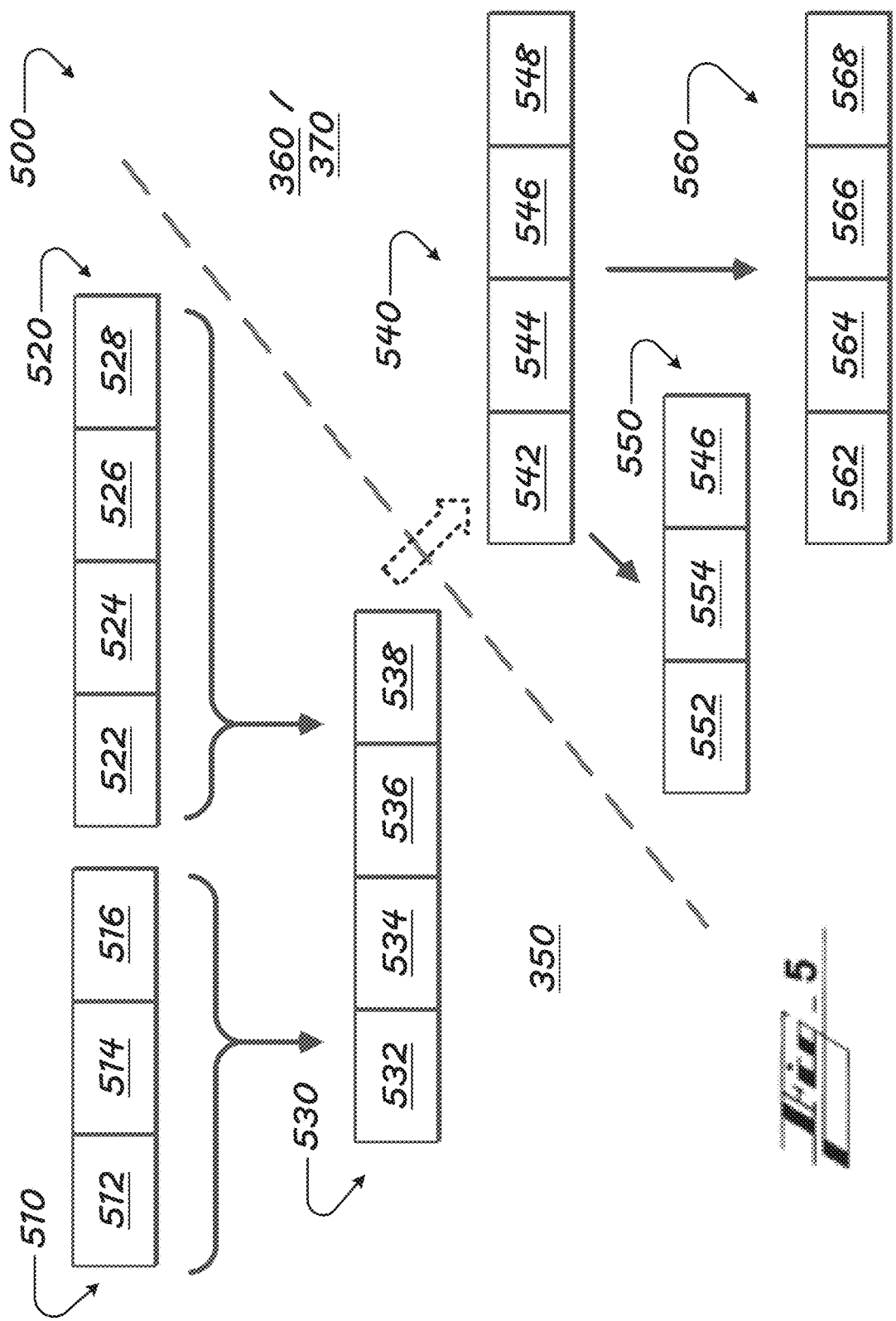

SYSTEMS AND PROCESSES FOR MANAGING ACCESS TO VEHICLE DATA

TECHNICAL FIELD

The present disclosure relates generally to vehicle data and, more particularly, to systems and processes controlling access by local devices to the vehicle data.

BACKGROUND

This section provides background information related to the present disclosure, which is not necessarily prior art.

Modern vehicles and mobile devices allow various interactions between them. Phone projection systems are becoming increasingly popular, for instance.

A projection system allows a user to operate a smartphone via a vehicle interface, such as a touch-sensitive display or audio system of the vehicle. Also, select output of compatible mobile-device applications, such as mapping or video apps, may be received at the vehicle from the phone and communicated to the user by way of the vehicle interface.

Such products, allowing a vehicle screen to mirror a smartphone screen, or the vehicle screen to be used to control the smartphone, are limited to these functions, however.

SUMMARY

There is a need for systems and processes for managing access to vehicle data by devices outside of vehicle. Example extra-vehicle devices include user smartphones and universal-serial-bus (USB) devices.

In various embodiments, vehicle data is provided to the extra-vehicle device in response to request from the device, via wired or wireless connection.

The systems of the present technology are configured to provide any of a variety of functions related to sharing or blocking access for extra-vehicle devices to vehicle data. Functions, which can be referred to as gateway functions, may include access, transaction enforcement and monitoring, and dynamic governing based on factors including efficiency. Example efficiency functions include aggregation or merger of multiple vehicle-data requests, and corresponding split or division data for delivery to satisfy the requests.

In one aspect, the present technology relates to a gateway apparatus for managing local-device access to vehicle data. The gateway apparatus may be middleware. The apparatus includes or is connected to input and output ports for receiving requests for vehicle data from a local device, such as a USB device, such as but not limited to a mass-storage device, and sending the vehicle data to the local device.

The apparatus also includes a tangible processing unit in communication with the input port and the output port, and a non-transitory computer-readable storage device. An access unit of the apparatus has access-unit code that receives, by way of the input port, a request for the vehicle data from a local device and determines whether the gateway apparatus may satisfy the request. A control unit has control-unit code that, when executed by the processing unit, determines what vehicle data will be provided. A data unit has data-unit code that prepares the vehicle data to be provided to the local device, and sends the vehicle data to the local device by way of the output port.

In various embodiments, the access-unit code, when executed by the hardware-based processing unit, receives, by way of the input port and from a remote source, business-logic instructions, and the control-unit code, when executed by the hardware-based processing unit, uses the business-logic instructions in determining the vehicle data to be provided to the local device.

The control-unit code in various implementations includes data-category-filter code that, when executed, determines the vehicle data will be provided to the local device based on one or more factors selected from a group consisting of (i) a limit on what can be provided by the vehicle and (ii) information authorized to be provided by the gateway apparatus to the local device.

In various embodiments, the control-unit code comprises a data-format-decision-module code that, when executed, determines a format for vehicle data to be provided to the local device for responding to the request. In some cases, the format for vehicle data determined includes a contextual format generated based on raw vehicle data, and/or the format for vehicle data determined includes a substantially non-processed form of raw vehicle data.

The control-unit code in some cases includes data-quality-decision-module code that, when executed, determines quality for the vehicle data to be provided to the local device. In some cases, the quality indicates one or more of: a frequency by which the vehicle data will be provided to the local device; an accuracy of the vehicle data to be provided to the local device; an amount of the vehicle data to be provided to the local device; a quality of service for the vehicle data to be provided to the local device; a latency with which the vehicle data will be provided to the local device; a throughput by which the vehicle data will be provided to the local device; level of the vehicle data, in the form of raw vehicle data, to be provided to the local device; and level of the vehicle data, in the form of contextual vehicle data, to be provided to the local device.

In various embodiments, the data-quality-decision-module code determining, when executed by the hardware-based processing unit, the quality for the vehicle data to be provided to the local device, up-sampled, providing a higher quality of vehicle data in one or more ways, than the vehicle data requested by the local device.

The data-quality-decision-module code determining, when executed by the hardware-based processing unit, the quality for the vehicle data to be provided to the local device, down-sampled, providing a lower quality of vehicle data in one or more ways, than the vehicle data requested by the local device, in various implementations. The downsampling may be performed in response to determining at least on factor selected from a group consisting of (i) a limit on what can be provided by the vehicle, and (ii) a limit on quality authorized to be provided to the local device.

In various embodiments, the local device is a first local device, said request is a first request corresponding to a first application operating at the local device, the control-unit code, when executed by the hardware-based processing unit, receives a second request corresponding to a second application operating at the first local device or at another local device, and the control-unit code, when executed by the hardware-based processing unit, merges the first request and the second request, yielding a merged request that can satisfy both requests simultaneously.

The data-unit code in some cases, when executed by the hardware-based processing unit, (i) prepares a combined vehicle data file comprising vehicle data for satisfying both the first request and the second request, (ii) splits the combined vehicle data file into a first vehicle data file, corresponding to the first request, for meeting first vehicle-data needs of the first application, and a second vehicle data file, corresponding to the second request, for meeting second vehicle-data needs of the second application, and (iii) in sending the data to the local device by way of the output port, sends, by way of the output port, the first vehicle data file to the first local device for use by the first application, and the second vehicle data file for use by the second application. In some implementations, (iv) the control-unit code includes data-quality-decision-module code that, when executed, determines data quality for vehicle data to be used to satisfy first vehicle-data needs, of the first application, and second vehicle-data needs, of the second application, wherein (v) the first request includes request for vehicle data of a first type at a first quality, (vi) the second request includes request for vehicle data of the first type at a second quality, and (vii) the data-quality-decision-module code determines, when executed by the hardware-based processing unit, to upsample regarding the first request, corresponding to the first application—determining to provide higher-quality vehicle data than requested in the first request—in response to the second quality being higher than the first quality.

Various aspects of the present technology include non-transitory computer-readable storage devices, processing units, and algorithms configured to perform any of the operations described.

Other aspects of the present technology will be in part apparent and in part pointed out hereinafter.

DESCRIPTION OF THE DRAWINGS

FIG. 5 shows schematically example data content merge and split operations.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, systems, constituent hardware, algorithms and protocols, and processes performed thereby for managing access to vehicle data by extra-vehicle devices.

While select examples of the present technology describe transportation vehicles or modes of travel, and particularly automobiles, the technology is not limited by the focus.

The concepts can be extended to a wide variety of systems and devices, such as other transportation or moving vehicles including aircraft, watercraft, trucks, busses, trolleys, trains, commercial or manufacturing equipment (a forklift, for example), construction machines, agricultural machinery, warehouse equipment, office equipment, home appliances, personal or mobile computing devices, such as phones, wearables, plug-ins, and wireless peripherals, the like, and other.

II. Host Vehicle—FIG. 1

Figure 1:
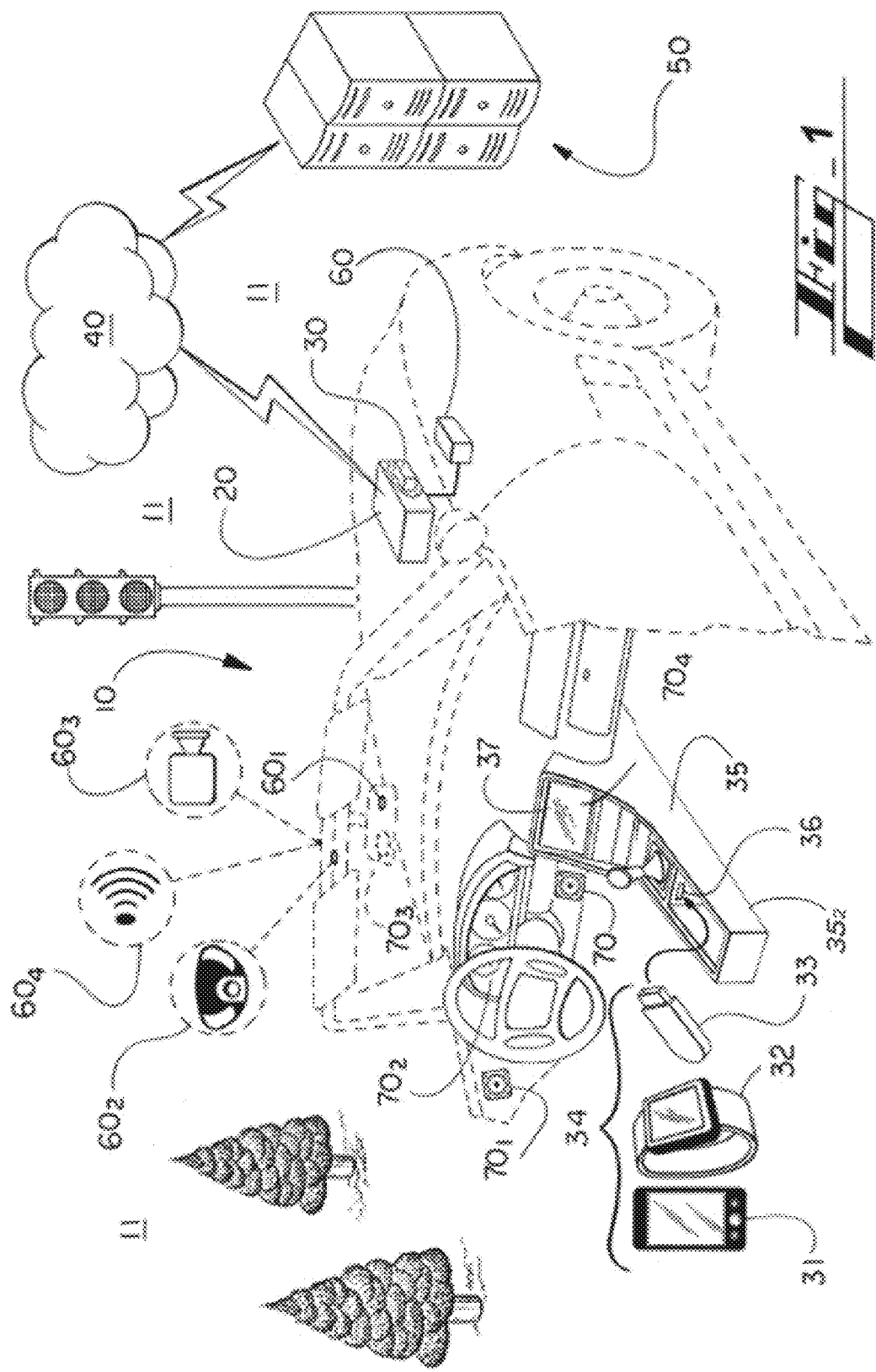
FIG. 1 illustrates schematically an example vehicle of transportation, with local and remote computing devices, according to embodiments of the present technology.

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34 and external networks 40.

By the external networks 40, such as the Internet, a local-area, cellular, or satellite network, vehicle-to-vehicle, pedestrian-to-vehicle, road-side infrastructure networks, the like or other, the vehicle 10 can reach mobile or local systems 34 or remote systems 50, such as remote servers.

Example mobile or local devices 34 include a user smartphone 31 and an example user wearable device 32 in the form of a smartwatch. Another example mobile or local device 34 includes a user wireless or plug-in device, such as a USB device.

Other example wearables 32 include smart apparel, such as a shirt or belt, an accessory such as arm strap, or smart jewelry, such as earrings, necklaces, and lanyards.

Still another example mobile or local device is an on-board device (OBD) (not shown in detail), such as but not limited to a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN) and/or Ethernet. The CAN/Ethernet message-based protocol is typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals. Communications between the OBD(s) and the primary controller or microcontroller 20 are in other embodiments executed via similar or other message-based protocol.

The vehicle 10 also has various mounting structures 35. The mounting structures 35 include a steering wheel $35_1$, a central console $35_2$, and a dashboard or instrument panel $35_3$. The mounting structures 35 also include or host a plug-in port 36—a USB port, for instance—and a visual display 37, such as a touch-sensitive, input/output, human-machine interface (HMI).

The vehicle 10 also has a sensor sub-system 60 including sensors providing information to the controller 20. Sensor input to the controller 20 is shown schematically at the right, under the vehicle hood, of FIG. 1. Example sensors having base numeral 60 ($60_1$, $60_2$, etc.) are also shown.

Sensor data relates to features such as vehicle operations, vehicle position, and vehicle pose, user characteristics, such as biometrics or physiological measures, and environmental-characteristics, such as weather, road condition, the like or other, pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, road conditions, obstacles, pedestrians, etc.

The sensors 60 can also include or be in communication with locating components, such as GPS components for determining vehicle location.

The OBDs mentioned can be considered as local devices, sensors of the sub-system 60, or both in various embodiments.

Local devices 34—for instance, user phone, user wearable, or user plug-in device—can be considered as sensors 60 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

Example inputs from the vehicle sensor sub-system 60 include and are not limited to:
  vehicle dynamics or kinematics sensors, such as vehicle speed (for instance, tire-rotation) sensor, vehicle acceleration or other movement, such as an inertial-momentum unit (IMU), having one or more accelerometers, a vehicle pose or other dynamics, such as position, speed, acceleration, or height—for instance, vehicle height sensor, brake sensors, steering angle sensor, any other sensors for providing any vehicle gauge or telematics information;
  bio-metric/physiological sensors providing bio-metric data regarding vehicle occupants, such as facial features, voice recognition, heartrate, salinity, skin or body temperature for each occupant, etc.;
  vehicle-occupant input devices, such as vehicle human-machine interfaces (HMIs), such as a touch-sensitive screen, buttons, knobs, microphones, and the like;
  cabin sensors providing data about characteristics within the vehicle, such as vehicle-interior temperature, in-seat weight sensors, and motion-detection sensors; and
  environment sensors providing data about conditions about a vehicle, such as from external camera, distance sensors (for instance, LiDAR, radar), and temperature sensors, precipitation or moisture sensor, or any sensor for sensing or measuring characteristics of an environment of the vehicle.

The vehicle 10 also includes cabin output components 70, such as audio speakers $70_1$, and an instruments panel or display $70_2$. The output components may also include a dash or center-stack display screen $70_3$, a rear-view-mirror screen $70_4$ (for displaying imaging from a vehicle aft/backup camera), any vehicle visual display device 37, autonomous driving components (steering, braking, etc.), and control components, for controlling any of these.

Example outputs 70 include and are not limited to:
  audio-output component, such as vehicle speakers $70_1$;
  visual-output component, such as vehicle screens $70_4$;
  vehicle-kinematics or dynamics actuators, such as those affecting autonomous driving—e.g., vehicle brake, throttle, or steering gear;
  vehicle-climate actuators, such as those controlling HVAC system temperature, humidity, zone outputs, and fan speed(s);
  local devices 34 and remote systems 34/50, to which the system may provide a wide variety of information, such as user-identifying data, user-biometric data, user-history data, contextual vehicle data (weather, road conditions, etc.), instructions or data for use in providing notifications, alerts, or messages to the user or relevant entities such as authorities, first responders, parents, an operator or owner of a subject vehicle 10, or a customer-service center system, such as of the OnStar® control center; and
  control components, if not included in these devices, for controlling any of these.

III. On-Board Computing Architecture—FIG. 2

Figure 2:
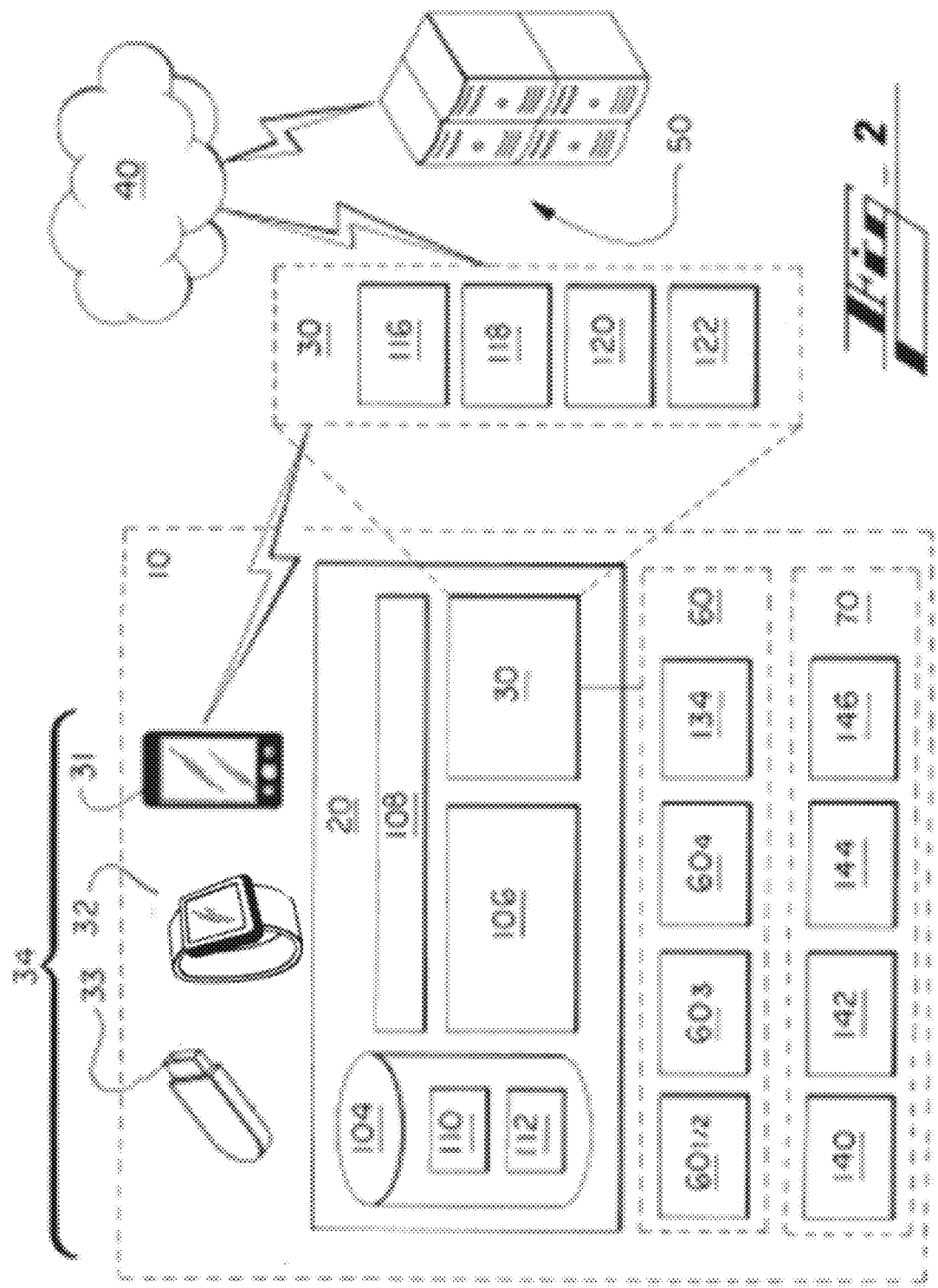
FIG. 2 illustrates more details of an example computer system, such as of the vehicle of FIG. 1 being in communication with the local device and remote computing devices.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is, in various embodiments, part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage units or modules 110 storing computer-readable code or instructions executable by the processing unit 106 to perform the functions of the controller system 20 described herein. The units or modules and functions are described further below in connection with FIGS. 3 and 4.

The data storage device 104 in some embodiments also includes ancillary or supporting components 112, such as additional software and/or data supporting performance of the processes of the present disclosure, such as one or more user profiles or a group of default and/or user-set preferences.

As provided, the controller system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. The component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The local device(s) 34 is configured with any suitable structure for performing the operations described herein. Example structure includes any or all structures like those described in connection with the vehicle computing device 20. A local device 34 includes, for instance, a processing unit, a storage medium comprising units or modules, a communication bus, and an input/output communication structure. These features are considered shown for the local device 34 by FIG. 1 and the cross-reference provided by this paragraph.

The remote devices 50 also is configured with any suitable structure for performing the operations described herein. Example structure includes any or all structures like those described in connection with the vehicle computing device 20. A remote device 50 includes, for instance, a processing unit, a storage medium comprising units or modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, user characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each position, or a select position, of (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include any of a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (for instance, positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras (for instance, visual-light-based (3D, RGB, RGB-D), infrared or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (for instance, RGB, RGB-D, 3D, or thermal or infra-red) or other sensor will likely be able to sense temperature of more of each passenger's body—for example, torso, legs, feet.

Two example locations for the camera(s) are indicated in FIG. 1 by reference numeral $60_1$, $60_2$, etc.—on at rear-view mirror and one at the vehicle header.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—for instance, vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric or physiological sensor, such as a camera used for retina or other eye-feature recognition, facial recognition, or fingerprint recognition, a thermal sensor, a microphone used for voice or other user recognition, other types of user-identifying camera-based systems, a weight sensor, breath-quality sensors (for instance, breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other output components, such as components providing an aroma or light into the cabin.

While the structure of FIG. 2 is described primarily in connection with the example context of a vehicle 10, other apparatus described herein, such as mobile or local devices, such as a user smartphone or USB device, may include any analogous structure. Each local device referenced herein may include a computer-readable storage device, for instance, with a processor, an input/output component such as a transceiver, etc.

IV. System Components, Algorithms, And Functions—FIGS. 3 AND 4

Figure 3:
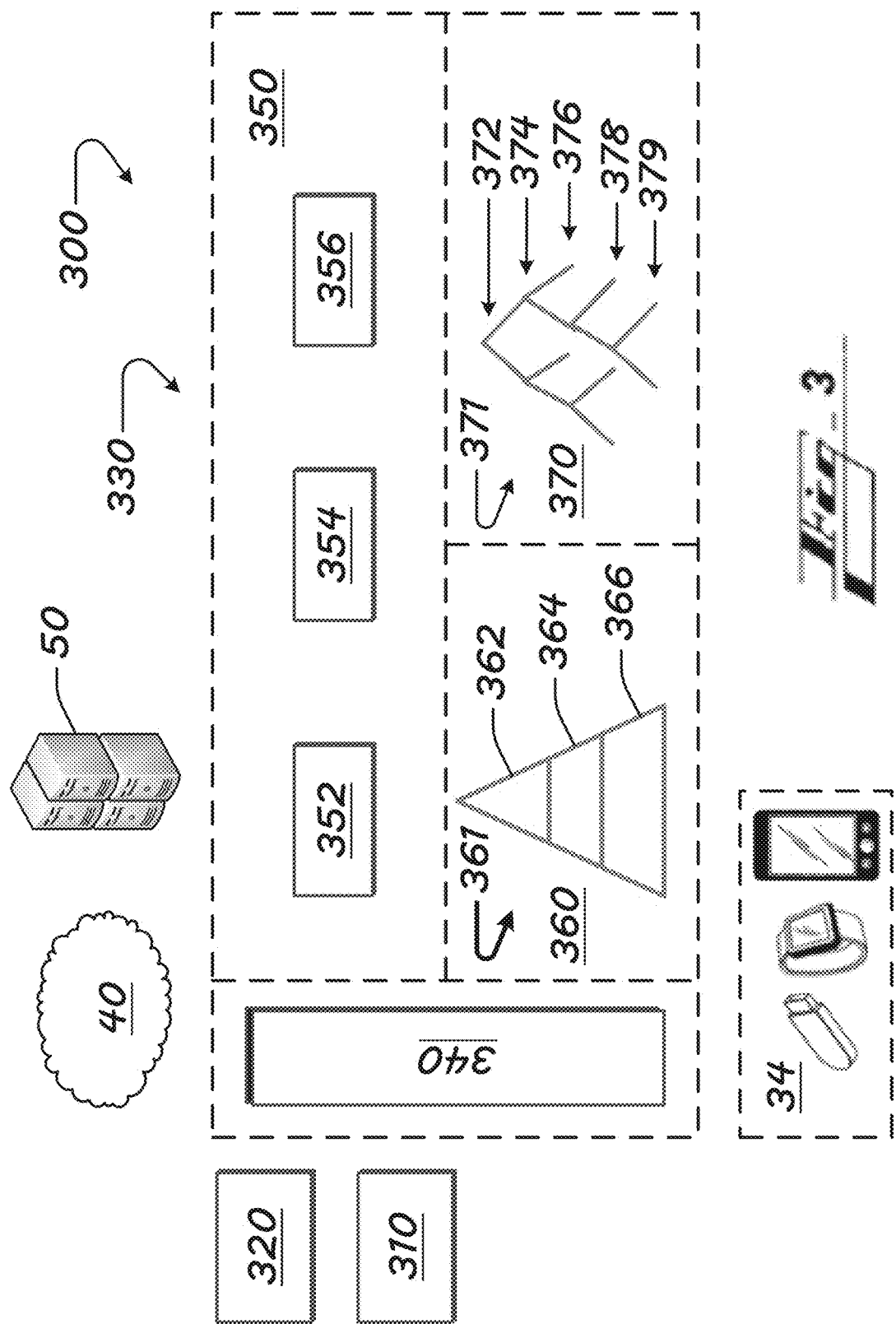
FIG. 3 shows a view of example system performance units.

FIG. 3 shows schematically a view 300 of various components. While a single view 300 is provided, any one or more of the components can be provided in a separate device from others.

Components include a gateway apparatus 330. The gateway apparatus 330 can include, be a part of, constitute or be referred to as other apparatus, such as an intelligent gateway, a gateway, an intelligent middleware, middleware, the like or other.

The gateway apparatus 330 include any suitable hardware or software, such as a processing unit, a tangible, non-transitory, storage device, and communication ports described herein, like those described in connection with the structures of FIGS. 1 and 2, and software configured to perform the functions described.

The gateway apparatus 330 in various embodiments includes an admissions or access unit 340, a control plane or control unit 350, a data plane or unit 360, and a context plane or unit 370.

Any components shown can be part of any of the various apparatus described herein. For instance, the gateway apparatus 330 or any parts thereof can be a part of the vehicle 10, such as parts of the processor and storage units 106, 104 thereof, part of a local device 34, such as the USB device 33, part of an OBD of the local devices 34, or part of a vehicle task manager (VTM). The VTM may reside on or be part of a customer-service system at the vehicle 10, such as an OnStar® system. The VTM may already be configured and arranged in the vehicle 10 to access certain data that may be requested by the local-device application(s), and may send data updates or status of connection and data-provision to the local device(s), to a remote server 50, such as a remote computing system of the customer-service arrangement.

In various implementations, the device having the gateway apparatus 330—whether at the vehicle 10 or added to or put in communication with the vehicle 10, by plug in or wirelessly (e.g., Bluetooth or WiFi)—is itself authenticated or otherwise given access to the vehicle data. The vehicle may confirm that the gateway apparatus 330 or device has authority based on a key, code, password, or other security-related indicia or protocol.

As another example, the admissions or access unit 340 can be part of or separate from the control unit 350.

The apparatus, such as the local device 34, in various embodiments, includes, in addition to the gateway apparatus 330, one or more applications 'on top' of the gateway apparatus 330, and an operating system supporting the apparatus 330. An example operating system is the Android OS, Linux, or iOS. ANDROID is a registered trademark of Google, Inc. iOS is provided by Apple, Inc. Linux is a registered trademark of William R. Della Croce Jr., of Boston, Mass.

The control plane, or unit, 350 in various embodiments includes a data category filter 352, a data format decision module 354, and a data-quality decision module 356.

The data plane, or unit, 360 in various embodiments includes vehicle data 361, or base vehicle data, in each of multiple levels. The base vehicle data 361 may also be referred to as raw data, though it in some embodiments includes data yielded from slight processing or formatting of raw data—e.g., slight processing or raw vehicle sensor data. The data would not, though, manipulated as done to render contextual vehicle data 371.

Levels of base vehicle data 361 can include, for instance, levels of resolution, detail, the like or other. In the example of FIG. 3, base vehicle data falls in three levels: low-resolution data 362, medium-resolution data 364, and high-resolution data 366.

The context unit 370 in various embodiments includes contextual vehicle data 371 in each of multiple levels. The vehicle data may also be referred to as context vehicle data, and the unit 370 as a context plane or unit or context-data plane or unit.

Example levels of contextual vehicle data include low-level contextual vehicle data 372, medium-level contextual vehicle data 374, high-level contextual vehicle data 376, very-high-level contextual vehicle data 378, and ultra-high-level contextual vehicle data 379.

Contextual vehicle data 371 is rendered by manipulating, translating, interpolating, extrapolating, or the like, vehicle data, such as base vehicle data 361. While base vehicle data 361 includes vehicle data directly from vehicle sensors, or with light processing or formatting, contextual vehicle data 371 can be viewed more as knowledge or knowledge data, compared to the standard or base vehicle data, generated by forming conclusions or valuable output based on the base vehicle data.

By providing contextual vehicle data, the work of modifying raw or base vehicle data to more usable conclusions, knowledge, or information is done before the information is provided to the local device(s) 34. Developers of applications for mobile or local devices, such as a smartphone or USB device, can enjoy much more freedom in development knowing that generating contextual vehicle data is performed at the vehicle—such as at a vehicle central-stack module or heads-up unit—or at a vehicle-connected local device such as an OBD or USB device. The mobile or local non-vehicle apps can in this case be developed to rely on the contextual vehicle data, and without extensive time and effort to structure modules to generate the contextual vehicle data based on raw or base vehicle data. In contemplated embodiments, vehicle apps also use the contextual vehicle data generated, whether generated at the vehicle or local device connected to the vehicle wirelessly, such as by Bluetooth, or by wire, or plugged in.

The context-data levels can represent levels of contextual detail or specificity, the like, or other. In the example of FIG. 3, the contextual vehicle data shown is in three levels—low-resolution data 362, medium-resolution data 364, and high-resolution data 366.

As a general example comparing base vehicle data 361 with contextual vehicle data 371, base vehicle data from a vehicle radar sensor 60 may indicate that an object having a height of 2 meters and width of about 0.5 meters is detected 3 meters behind the vehicle, and then that an object (the same) is detected 2.9 meters, then 2.8 meters, and contextual vehicle data 371, which can be based on the same base vehicle data 361, can indicate that apparently a person is behind the vehicle, and getting closer to the vehicle.

As another example, contextual vehicle data may indicate that driver hands are both on the wheel, or more particularly that they are at the 10 and 2 positions, or at acceptable or recommended positions, on the steering wheel, versus raw data indicating readouts of numerous steering-wheel sensors.

Vehicle data that may be requested by local devices 34 includes data that is traditionally proprietary to the vehicle, such as data transferred within the vehicle by way of a controller area network (CAN) serial line or bus (CAN data), or other serial lines or busses within the vehicle 10. Example vehicle sources or transports for vehicle data include a powertrain bus, a human-machine interface (HMI) bus, carrying data related to interactions with the user such as window or HVAC control, chassis communications bus (e.g., stability control information), and active safety module bus, relating to fuel level, vehicle sensing data, advanced driving assistance systems (ADAS), the like or other.

The vehicle data in various embodiments includes data received at or generated at the vehicle 10, such as at or using a vehicle embedded peripheral, which can include, but are not limited to any vehicle sensor 60, transceiver, or receiver, such as a GPS receiver.

Example vehicle data is data indicating steering wheel angle, data indicating vehicle wheel speed, fuel level, distance to a proximate object, data indicating break line pressure, data indicating cabin temperature, data indicating exterior temperature, etc. Vehicle data in various embodiments also includes any data generated at and/or obtained by the vehicle 10, such as navigation data, or geographic or other location data.

The technology in various embodiments controls or limits the data that can be provided, such that not all vehicle data is available, but rather only controlled types of vehicle data, or data from specified sources at the vehicle 10, can be available based on the circumstances—e.g., access requirements and context including current capabilities of the vehicle and/or gateway apparatus 330. For instance, available data may include only vehicle-information-systems data, and possibly only information that is typically available for provision to a vehicle driver via a vehicle interface such as screen or audio system. Limitations could include, for instance, non-availability of some or all vehicle-control-systems data, such as headlamp direction or more safety-critical information such as regarding breaking, steering, or throttle.

In some implementations, data is bundled for efficiency of operation at the vehicle 10 and/or gateway apparatus 330. If the local device 34 wants only outside temperature data, for instance, the vehicle may send raw data and/or contextual vehicle data relating to outside and cabin temperatures, as they may already be bundled in a file or any other type of data structure.

As a general example regarding the levels 362, 364, 366 of base vehicle data 361:
  low-resolution base vehicle data 362 may indicate that environmental moisture is sensed;
  medium-resolution base vehicle data 364 may indicate an amount of moisture sensed; and
  high-resolution base vehicle data 366, may indicate change in the amount of moisture sensed over time.

As a general example regarding the levels 372, 374, 376, 378, 379 of contextual vehicle data 371:
  low-level contextual vehicle data 372 may indicate any related base vehicle data and that it is precipitating;
  medium-level contextual vehicle data 374 may indicate the above (low-level contextual vehicle data 372 and any relevant base vehicle data) that it is raining and that there may be ground freezing based on environment temperature(s);

high-level contextual vehicle data 376 may indicate any of the above and that the road is icy or ground is frozen, based on raw tire slip data, temperature data, and/or other, or the road has some anomaly(ies), such as potholes or construction blockade;

very-high-level contextual vehicle data 378 may indicate any of the above and an amount of ice on the road, based, for instance, on temperature(s), tire slip data, road geometry (e.g., sloped, convex, other shape), ground temperature measurements, social-media data, an amount of precipitation in the area (from vehicle sensors, sensors of other vehicles (e.g., crowdsourcing), remote weather services, etc.), the like or other supporting data; and ultra-high-level contextual vehicle data 379 may indicate any of the above and a manner that the vehicle 10 is expected to react to the icy-road characteristic, such as how it will likely slip, under certain dynamic- or kinematic-related conditions (vehicle weight, velocity, acceleration, road pitch, etc.), or indicates how the vehicle would be expected to traverse the road if a planned or possible vehicle maneuver is made, such as a turn at a current vehicle speed or velocity.

These and other structures and functions related to the gateway apparatus 330 are described further below with reference to FIG. 4.

Figure 4:
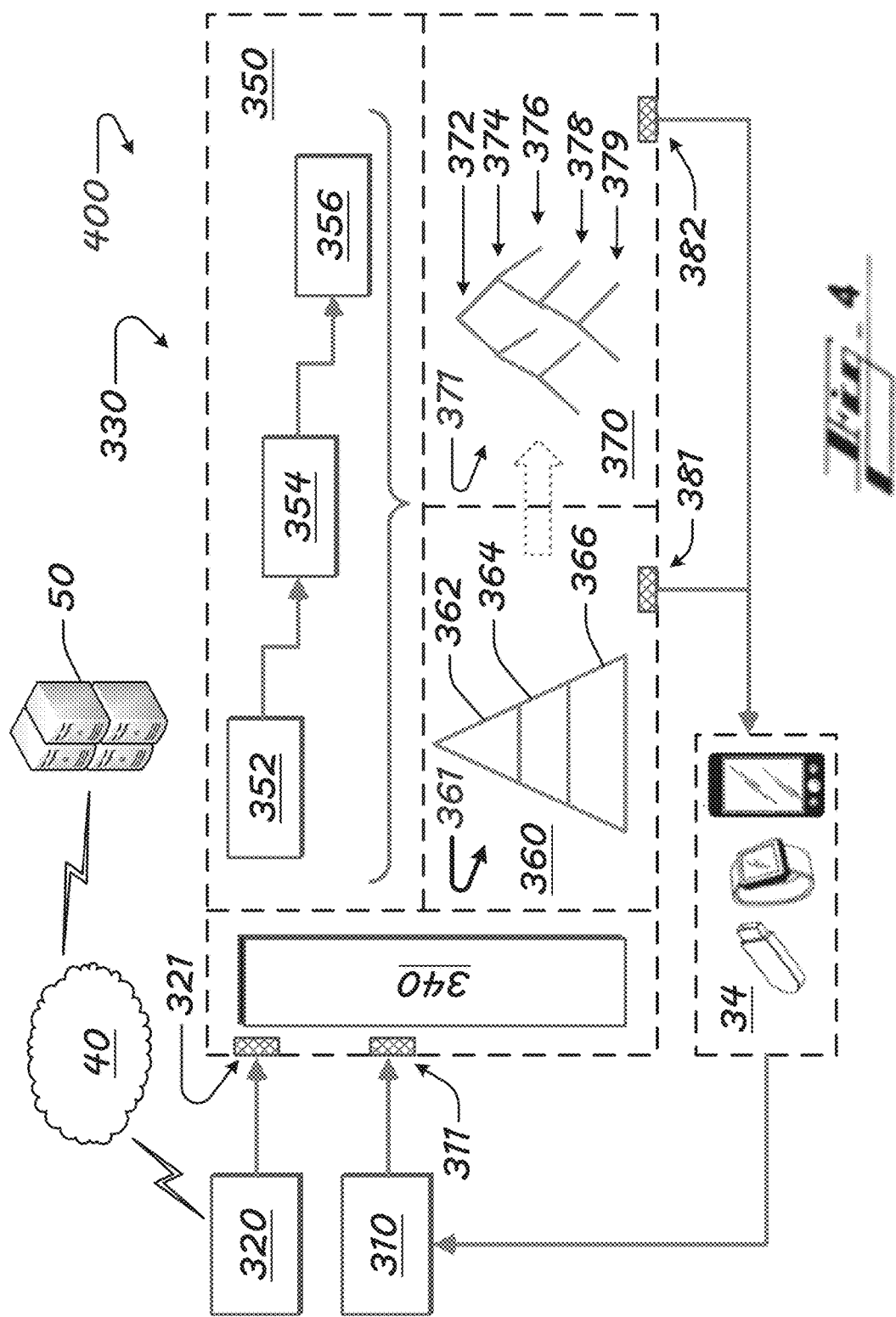
FIG. 4 shows interactions between components of FIG. 3.

FIG. 4 shows the components of FIG. 3 and various interactions between them as they perform their functions. Functions and interactions are performed according to one or more example algorithms, processes, or routines represented schematically by the flow shown, according to embodiments of the present technology. The algorithms, processes, and routines are at times herein referred to collectively as processes or methods for simplicity.

Though a single flow is shown for simplicity, any of the functions or operations can be performed in one or more or processes, routines, or sub-routines of one or more algorithms, by one or more devices or systems.

The steps, operations, or functions of the processes are not presented in any particular order and performance of some or all the operations in an alternative order is possible and contemplated. The processes can also be combined or overlap, such as by one or more operations of one of multiple processes being performed in one of the other processes. The operations have been presented in the demonstrated order for ease of description and illustration. Operations can be added, omitted and/or performed simultaneously without departing from the scope of the appended claims. It should also be understood that the illustrated processes can be ended at any time.

In various embodiments, some or all operations of the processes and/or substantially equivalent operations are performed by one or more computer processors, such as the hardware-based processing unit 106 of the vehicle 10, or such a processing unit of a local or mobile device, for instance, executing computer-executable instructions stored on a non-transitory computer-readable storage device of the respective device, such as the data storage device 104 of the vehicle system 20.

The gateway or middleware apparatus 330 controls access for local devices 34 to vehicle data and information. The admissions or access unit 340 of the gateway apparatus 330 performs at least initial access functions.

The local devices 34 provide to the gateway apparatus 330 vehicle data request, indicated schematically by block 310 in FIG. 4.

The gateway apparatus 330 includes a first port 311 for receiving data requests 310. The port in various embodiments includes hardware and supporting software, or is connected to any suitable hardware and software—such as of a host USB device or of the vehicle 10—and such combination may be referred to collectively as the port 311.

The request 310 may include any of various types of description or indication of the data needed, and may include related parameters. The request 310 may indicate, for instance, a need for vehicle fuel level or range (distance to empty). The request 310 may also indicate quality or characteristics of the data requested, such as update frequency, resolution, accuracy. As an example, the request 310 may indicate that the local-device application wants or needs to know vehicle speed, every 20 m/s, and wants exterior temperature data only at least every 30 minutes. As another example, the request 310 may indicate a need for vehicle speed whenever the speed has changed by 1 kph since the last reporting to the application, and with an accuracy of at least 0.2 kph.

The gateway apparatus 330 also receives, from any of a variety of sources, base software and software updates or rules, such as business logic, as indicated by block 320.

The gateway apparatus 330 also includes a second port 321 for receiving the rules, software updates, or business logic 320. The port in various embodiments includes hardware and supporting software, or is connected to any suitable hardware and software—such as of a host USB device or of the vehicle 10—and such combination may be referred to collectively as the port 321. The first and second ports 311, 321 may be a single port performing both sets of functions. The ports may include at least one wire-based and/or wireless-based transceiver, having, for wireless communications, short-, medium-, and/or long-range capabilities.

Rules, whether received from a remote or local source and/or already programmed into the gateway apparatus 330, may include, constitute, or be a part of a generic or customized vehicle information management and maintenance mechanism, controlling gateway apparatus functions, such as upfront access and dynamic management of access and data provision.

Rules, whether received from a remote or local source, or already programmed into the gateway apparatus 330, may indicate, as just a few examples, any one or more of the following:

requesting devices that may access vehicle data or participate in a session in which the device receives the vehicle data, such as devices having pre-approved media access control (MAC) addresses or other ID, code, or key associated with them, or addresses, codes, keys or the like within a pre-determined range or having a pre-determined type. The access control in various embodiments thus allows data provision, and perhaps only with certain quality—resolution, frequency, etc.—to any device via which an authorized code (active-subscription code, active membership code, the like or other. Regarding MAC or other addresses, in various embodiments the arrangement requires that each participating local device registers or subscribes to get an address, or code, key, or the like. Subscriptions can be provided at various levels, from one or more higher levels to one or more lower levels, for instance. A registration may occur between the local device 34 and a remote server or other system 50, which communicates with the gateway apparatus 330, for instance, or between the local device 34 and the gateway apparatus 330, which may in turn send updates of same to the remote system 50. The server is thus in various embodiments configured to provide such logic or rules to numerous participating vehicle systems.

devices made by a particular manufacturer may access vehicle data or may participate in a session by which the device receives the vehicle data.

type(s) of devices that may access vehicle data or may participate in a session by which the device receives the vehicle data. This may be useful for enforcing standards compliance or for certification safety reasons, for instance. As an example limitation, a tablet may be given access to vehicle data, but not a smartwatch, or vice versa.

key(s), code(s), or other indicia of authorization that may be provided by devices 34 request access to vehicle data.

account status, such as whether the local device 34, local-device app, or user of the same is subscribed to a service or offering involving the provision of vehicle data to the app via the gateway apparatus 330.

user types that can have access, and in some implementations various levels of access based on the user. For instance, a local device 34 being used by a passenger may have accesses, or greater access, to vehicle data than a driver user. As another example, a local device 34 of a parent may have access to more data than the local device 34 being used by a driving-age child. The child may have a different device 34 than the parent, and configured to be recognized differently, such as by having different codes, MAC addresses, keys, etc. Or the local device 34, the gateway, and/or the vehicle may be configured to determine whether the user of a single local device 34 is the child, parent, or other, such as by biometric recognition, password, communications with user mobile device, or other suitable manners. As another example, a vehicle driver may have different access rights via a local device 34 than a fleet owner or operator would via the same or other local device 34.

type(s) of data that may be accessed, by any and/or certain devices, under certain conditions, the like, and other.

an amount of data that may be accessed by any and/or certain devices, under certain conditions, the like, and other.

a quality of data—e.g., resolution, quality of service (QoS), accuracy, fidelity, etc.—that may be accessed by any or certain devices, under all or particular circumstances. The functioning can include filtering, such as to allow high-resolution data provision if a pre-determined or present circumstance or threshold for provision is determined present.

whether, and how to, downsample or upsample. Downsampling involves providing less than is requested, expected or needed by the requesting device, such as a lower resolution, amount, quality of data, or intervals than requested, the like, or other. Generally, upsampling involves providing more than requested, expected, or needed by the requesting device, such as a lower resolution, amount, or quality of data, via mechanisms such as interpolation or extrapolation.

how the system enforces and monitors transactions between the requesting device 34 and the vehicle 10, aggregates and splits data (reference FIG. 5), and governs dynamically interactions between the requesting device 34 and the vehicle 10. Aggregating and splitting may in some cases allow the system to efficient opportunities to upsample, as referenced more below.

Dynamic governing may involves, for instance, how to handle a request from a device 34 associated with a now-lapsed subscription allowing access to vehicle data—e.g., drop the connection and provide no further data until subscription renewed, or provide a lower quality, e.g., QoS until subscription renewed. Such lower-level offering can be referred to as a standard, base, or in some cases a free, vehicle-data-provision offering. In various embodiments, subscriptions can be linked to another transaction, such as a subscription being established as part of a car-rental or car-sharing agreement for a vehicle and local-device user. In some cases, the subject local device 34 can be owned by the owner of the car, while in other implementations the local device 34 is owned by the renting or sharing person, and authenticated for use during the rental or sharing.

whether the requesting device is a pre-approved or authorized device, such as a USB device provided by a same manufacturer as the maker of the vehicle 10, or providing request via such a per-approved or authorized device.

Following the flow of FIG. 4, request for data or a data session, at block 310. The access unit 340 determines whether the requesting device should have access to vehicle data, or should be able to participate in a data session with the vehicle 10.

The access unit 340 can use any suitable admission rules and circumstances or context for the determination, including any of those mentioned above. The circumstances in various embodiments include current resources available at the vehicle 10 and/or gateway apparatus 330 to accommodate the request and the admission consideration considers whether the resources are sufficient to accommodate the request.

In various embodiments the access unit 340 controls, based on the rules and circumstances, an initial sequence by which a request from a local device 334 is allowed or denied, or partially allowed or denied, as well as dynamic, ongoing, evaluations of the same accessibility based on any changed circumstances or metrics.

Particular examples of rules and circumstances processed to determine accessibility relate to bandwidth, computing capability, context, the like and any other suitable variables determined relevant and valuable to a system designer or user.

Regarding bandwidth, the relevant evaluation can be represented generally by the following bandwidth relationship:

$$\sum_{i=0}^{n} B_i \leq B?$$

wherein $B_i$ represents the bandwidths requested by each of the one or more present requests, summed ($\Sigma$) across n number of requests, and B represents total bandwidth available at the vehicle 10, gateway apparatus 330, and/or host device for the gateway apparatus 330, for meeting the requests.

Regarding capability, the relevant evaluation can likewise be represented generally by the following capability relationship:

$$\Sigma_{i=0}^{n} cblty_i \leq cblty?$$

wherein cblty$_i$ represents the computing capability required for meeting each of the one or more present requests, summed (Σ) across n number of requests, and cblty represents total computing capability available at the vehicle 10, gateway apparatus 330, and/or host device for the gateway apparatus 330, for meeting the requests.

Regarding context, the relevant evaluation can likewise be represented generally by the following context relationship:

$$\Sigma_{i=0}^{n} cbltx_i \leq cbltx?$$

wherein cntx$_i$ represents one or more relevant context factors pertinent to meeting each of the one or more present requests, summed (Σ) across n number of requests, and cntx represents context factors allowable per requirements of the vehicle 10, gateway apparatus 330, and/or host device for the gateway apparatus 330, for meeting the requests. The comparison ("≤", or each can be otherwise, such as "<", for instance), as in the other comparisons, need not represent a strict objective comparison of numerical values. It can represent, generally, whether each of present requests can be met. Example contexts include priority, sensitivity, privacy, or urgency contexts. A factor (cntx) related to context can include, for instance, allowing access to a local device 34 application for low-priority requests, such as an app for making a hotel reservation, only when the vehicle is parked. Another example factor related to context relates to the manner by which the vehicle is being driven—if the vehicle is being driven autonomously, certain data may not be provided because bandwidth is to be reserved to ensure sufficient bandwidth to serve the higher priority driving needs over local device application needs. The system can be configured to limit access particularly when the vehicle is being driven with full autonomy in a crowded or high-risk scenario, for instance.

Still other example rules include the type of device, the device ID, whether the requesting device presents a pre-authorization code or key, or other. Such rules may be generated and/or held at the vehicle, and some or all may be received from a local or remove source. The rules can be referred to as business logic, and are indicated schematically by the first block 320 at top left of FIG. 4.

In various embodiments, the access unit 340 is configured to provide partial access for one or more local devices 34 requesting access. The partial access can, for instance, include providing a local device 34 with access to only some of the vehicle data, or to less or lower level of data than requested. Some or all manners of providing less or a lower level of data can be referred to as downsampling, referenced above. Partial access can be implemented at the access unit 340 and/or at any of downstream components, such as at any of the components of the control unit 350, such as at any of the data category filter 352, the data format decision module 354, and the data quality-of-service (QoS) decision module 356.

The logic is in various embodiments received dynamically, including rules or updates based on changes circumstances, such as software changes needed, different system objectives, the like or other. The logic is in some implementations update or otherwise adjusted at the gateway apparatus 330, such as in response to existing or change circumstances determined by the control unit 350. Example circumstances include but are not limited to vehicle needs or requirements regarding vehicle (e.g., sensor) data and bandwidth. The changes can be implemented at any system components, such as at the access unit 340 or control unit 350, for instance. The change may warrant removing all or some access for one or more of the requesting local devices or apps thereof, or lowering or limiting access to data for any app, such as changing to providing less data or a lower level of data—e.g., lower QoS, frequency, volume, resolution, etc. Or a change can include reaching out to a local device, previously denied access, to advise that access can now be allowed, or by increasing an amount of quality of vehicle data provided to any local device—e.g., higher QoS, frequency, volume, etc.

In a contemplated embodiment, the access unit 340, whether part of the gateway apparatus 330, and/or other component of the gateway apparatus 330 communicates with at least one local device 34 to determine what level of vehicle-data-provision service can or will be provided. The interactions can be performed in response to the unit 340 or apparatus 330 determining that all requests cannot or preferably will not be satisfied fully. The unit or apparatus may determine, for instance, that while vehicle data can be provided to an application, or multiple applications, some of the vehicle data cannot be provided at a quality requested, such as frequency, amount, accuracy, etc. The communications can advise the local device(s) 34 on what can be provided. In some implementations, the gateway apparatus 330 then commences to provide the vehicle data provision according to the limitation(s) and/or vehicle-data-service quality/ies communicated. In some implementations, the apparatus 330 awaits a confirmation or acceptance from the local device before commencing to provide the contextual vehicle data according to the limitation(s) and/or data-service quality/ies communicated. In a further contemplated embodiment, the communications include some feedback from the local device(s) 34 indicating device preference or other indication that the unit or apparatus considers in determining the quality of vehicle data to provide. The communications can include negotiation operations, or similar operations can be used to find a best fit for the arrangement. As an example, (i) the access unit 340 advises the device that vehicle data according to the full request cannot be provided, (ii) the device advises that a lower frequency is sufficient, and (iii) the access unit 340 confirms and grants access. Or, (a) the access unit 340 advises the device that vehicle data according to the full request cannot be provided, (ii) the access unit 340 therein or separately advises the device of one or more qualities that cannot be met—e.g., accuracy, (iii) the device accepts the limitations or counters with other limitations, such as keeping accuracy but limiting frequency and amount, and (iv) the access unit 340 confirms and grants access.

In a contemplated embodiment, the request from the local device 34 includes information indicating a priority of qualities for the vehicle data requested. The request may include, for instance, an indication that accuracy is more important than frequency for the local-device application. If the gateway apparatus 330 needs to downsample in provision of vehicle data to the local device 34, it may use the prioritization scheme of the request to do so.

The control unit 350 of the gateway apparatus 330 in various embodiments controls the manner by which vehicle data is provided to the requesting device 34. While the device 34 is mentioned generally herein as a requesting device, functions of the system, including providing vehicle data to the device 34, is in various embodiments performed without the device 34 actually providing a request. It is contemplated that after the device 34 connects with the vehicle, and is authenticated via the access unit 340, the vehicle system 20 could be configured to, in response, provide certain vehicle data to the device 34. Or in connecting to the vehicle 10, the device 34 could provide information indicating a type of application running on the device 34, and the vehicle system 20 could be programmed to determine based on the type of application, what vehicle data should be provided to the device 34. These are just a few examples of how vehicle data can be provided to the local device 34 without the local device actually providing an explicit request for the vehicle data.

The data plane or unit 350 includes the data category filter 352, the data format decision module 354, and the data quality-of-service (QoS) decision module 356 in various embodiments.

The data category filter 352 filters or otherwise processes incoming requests based on rules such as the business logic 320 received, the requests, and other context such as vehicle needs. In various embodiments, the data category filter module 352 determines the vehicle data that will be provided to the application(s) of the requesting local device 34. Module 352 functions may be based on factors such as the request, rules including business logic, and other context such as limits to what can be provided or vehicle needs, such as bandwidth limits or vehicle needs for bandwidth. The functions in various embodiments include controlling substance of vehicle data provided. Such processing is performed to meet requirements of the present context, such as by only providing an app with vehicle data or information that the local device or that the gateway apparatus 330 is authorized to access.

The data format decision module 354 determines the best format of vehicle data to be provided to the local device 34 in response to the request. Example formats include vehicle data, raw or slightly processed, via the data unit 360, and contextual vehicle data, being processed or interpreted versions of raw data, via the context plane or unit 370.

As mentioned above, contextual vehicle data 371 is rendered by manipulating, translating, interpolating, extrapolating, or the like, data, such as base vehicle data 361. While base vehicle data 361 includes data directly from vehicle sensors, or with light processing or formatting, contextual vehicle data 371 can be viewed more as knowledge data, generated by forming conclusions or valuable output based on the base vehicle data. By providing contextual vehicle data, the work of modifying raw or base vehicle data to more usable conclusions, knowledge, or information is done. Developers of applications for mobile or local devices, such as a smartphone or USB device, can enjoy much more freedom in development knowing that generating contextual vehicle data is performed at the vehicle—such as at a vehicle central-stack module or heads-up unit—or at a vehicle-connected local device such as an OBD or USB device. The mobile or local non-vehicle apps can in this case be developed to rely on the contextual vehicle data, and without extensive time and effort to structure modules to generate the contextual vehicle data based on raw or base vehicle data. In contemplated embodiments, vehicle apps also use the contextual vehicle data generated, whether generated at the vehicle or local device connected to the vehicle by wire—e.g., plugged in—or wirelessly.

The data quality decision module 356 determines appropriate reporting requirements for use in delivering vehicle data to the vehicle 10, such as one or more qualities, features, or manners by which data is provided to the local device 34 via the data unit 360 and the context unit 370. The data-quality decision module 356 determines, for instance, quality-of-service (QoS), resolution of data being provided, frequency or rate by which it is provided, and whether it should downsampled or upsampled and by what amount. As mentioned, downsampling involves providing less than is requested, expected or needed by the requesting device, such as a lower resolution, amount, quality of data, or intervals than requested, the like, or other. Generally, upsampling involves providing more than requested, expected, or needed by the requesting device, such as a lower resolution, amount, or quality of data.

Although the module 356 in various embodiments determines more than what may be considered quality of service, the module may be referred to as a QoS decision module 356.

The functions in various embodiments include controlling timing of data provision, such as to affect factors such as levels of latency, throughput, and jitter of the data provided. Such processing is performed to meet requirements of the present context including needs or requirements of the requesting local-device application, availability of data at the vehicle 10, and other needs, such as of the vehicle 10 and/or apps of other local devices 34 or remote devices, such as a server 50.

In various embodiments, the data quality decision module 356 determines whether or to what extent the vehicle 10, gateway apparatus 330, or device hosting the gateway apparatus can meet requirements of present requests, including but not limited to requests from local devices 34 for vehicle data 10, in one or more areas including quality of service (QoS), latency, and throughput. Respective processing can be shown generally by:

$$\sum_{i=0}^{n} QoS_i < QoS?$$

$$\sum_{i=0}^{n} Lat_i < Lat?; \text{ and}$$

$$\sum_{i=0}^{n} Thput_i < Thput?$$

wherein:
QoS$_i$ represents the quality-of service levels requested by each of one or more present requests, summed ($\Sigma$) across n number of requests, and QoS represents total quality-of service available at the vehicle 10, gateway apparatus 330, and/or host device for the gateway apparatus 330, for meeting the requests;
Lat$_i$ represents the latency levels requested by each of one or more present requests, summed ($\Sigma$) across n number of requests, and Lat represents total latency available at the vehicle 10, gateway apparatus 330, and/or host device for the gateway apparatus 330, for meeting the requests;
Thput$_i$ represents the latency levels requested by each of one or more present requests, summed ($\Sigma$) across n number of requests, and Thput represents total latency available at the vehicle 10, gateway apparatus 330, and/or host device for the gateway apparatus 330, for meeting the requests; and
Each "<" symbol can be otherwise, such as "≤", for instance.

As provided, in various embodiments, any of downstream components, such as at any of the components of the control unit 350, such as at any of the data category filter 352, the data format decision module 354, and the data quality-of-service (QoS) decision module 356 and/or the access unit

340 is configured to provide partial access for one or more local devices 34 requesting access. The partial access can, for instance, include providing a local device 34 with access to only some of the vehicle data, or to less or lower level of data than requested—e.g., lower amount, frequency, accuracy, QoS, etc. Some or all manners of providing less or a lower level of data can be referred to as downsampling, referenced above. Partial access can be implemented at the access unit 340 and/or at.

Based on the determination(s) of what data to provide and, in some embodiments, at what levels or qualities, the system then provides raw, or slightly processed raw data, and/or contextual vehicle data accordingly by way of the data unit 360 and the context unit 370. The context unit 370 is a type of data plane. The data unit 360 may also be referred to as a raw data plane or unit, though the data provided to the local device 34 need not be fully raw—e.g., can be a slightly processed—e.g., transformed, simplified—from the data provided by a vehicle sensor(s), GPS unit or other source.

Various example levels by which the data can be provided are described above, including high, medium, or low 366, 364, 362 base vehicle data, and low, medium, high, very-high, and ultra-high-level contextual vehicle data 372, 374, 376, 278, 379, depending on the circumstances—app needs, data available, vehicle needs, vehicle ability, business logic, the like, and other.

Requests from the local device 34 in various implementations include update requests or information, such as in response to changes in operation of the application. The application may determine that it needs different, additional, or less data than previously requested, for instance. The gateway apparatus 330 adjusts its processing—of the control plane 350, the data unit 360, and the context unit 370, for instance—accordingly.

The process can end or any one or more operations of the process can be performed again.

V. Merge And Split Operations—FIG. 5

FIG. 5 shows schematically an example arrangement 500 for data content merge and split operations.

The operations may be performed at any suitable system or sub-system disclosed, such as at the local-device 34, the gateway apparatus 330, and/or the vehicle 10. Gateway functions may be performed at the control unit 350 and base-data unit 360. At the control unit 350, functions may be performed at the data-format unit 354 and/or at data-quality units 356, for instance.

By way of example, FIG. 5 shows functions or merger (or aggregation) and split (or divide, distribute, the like, or other, etc.) being performed at the control unit 350 and the data unit 360. In various embodiments, merge and split operations are performed when two or more applications, whether being operated at the same local device 34, are requesting related or overlapping vehicle data. Different apps may request the same data but at different levels of quality or requirement, for instance, such as by one requesting steering angle every 10 m/s while another app wanting steering angle data only every 50 m/s. As another example, one application may want feeds for four types of data: yaw rate data, steering angle data, outside temperature, and cabin temperature, while another application wants only the first three—yaw rate data, steering angle data, and outside temperature.

In the example of FIG. 5, the four types of data requested by the first app 520 are indicated by blocks 522, 524, 526, 528, respectively, and the three of the second app 510 are indicated by 510, 512, 514, respectively. While two apps are referenced in the example, the arrangement 500 may handle requests from more than two apps, whether operating at the same, or two or more other local devices.

The vehicle data requested at block 522 is the same type of vehicle data—being, e.g., yaw rate data—as that of block 512; the vehicle data of block 524 is the same type of data as that of block 514; and the vehicle data of block 526 is the same type of data as that of block 516. The request for vehicle data in each set (512/522, etc.), while having a similar type, may or may not be requested by the local-device application at the same quality—e.g., frequency, accuracy, etc., as referenced in the prior paragraph regarding minimum requirements or wants for frequency for steering angle data provision.

FIG. 5 also shows the fourth, non-common, vehicle data item or feed 528 requested of the first app 520, which is cabin temperature in the above example.

The control unit 350, determines that there are commonalities between the data request packets 510, 520 (or packages, files, etc.)—e.g., data request 512 being requested being of the same type of as data request 522. The control unit 350 merges or aggregates the request packets 510, 520 to a common request packet 530, accordingly. The merger is based in some embodiments on common denominator between the original request packets 510, 520, such as but not limited to the similar data types (512/522, etc.) requested. In some embodiments, the merged packet can be generated by abstraction, or abstracted, as dynamic data model to satisfy different types of data requests.

Regarding the abstraction model, the control unit 350 may abstract the requests issued by the different apps. The apps in various embodiments subscribe to a set of data regarding two or more vehicles, such as overlapping vehicle data sets, with various requirements—e.g., QoS, volume, frequency, etc. As an example, a first app, or App 1, requires or requests, and receives, speed information at 5 Hz, while App 2 only needs speed information at 1 Hz. In this case, the control unit will merge the two requests into one request, but take necessary up-sampling task to the 5 Hz level so that both App 1 and App 2 are satisfied at the same time, or by the same data transmission(s).

The resulting or merged packet 530 includes a number of requests 532, 534, 536, 538 corresponding respectively to the first three, common, requests 512/522, 514/524, 516/526, and a fourth request 538 corresponding to the fourth request 528 of the first application.

The requests of the merged packet 530, in various embodiments, include all qualities, including those conflicting. In some implementations, the control unit 350 determines one or more differences between related requests—e.g., between request 512 and related request 522—and according rule, determines whether to keep differing features, or select amongst them, such as selecting a more stringent request of the two requests for the same type of vehicle data—e.g., keeping, regarding the two steering angle vehicle data requests 514, 524, only the stricter 10 m/s feature.

The control unit 350 provides the merged package 530 to the data unit(s) 360, 370. The data unit(s) 360, 370 obtains vehicle data for satisfying the request packets 510, 520. The resulting vehicle data packet 540 may be generated by the unit(s) 360, 370 interpolating the data obtained, in order to satisfy the various requests as best able or deemed most appropriate.

Generating the resulting data packet 540 may involve including a higher quality—higher volume of data, higher accuracy, more contextual vehicle data versus more standard or raw data, etc.—in association with one of the applications, than that application had requested. This may be because another application requested the same type of data at a higher quality, as described above regarding the 10 m/s versus 50 m/s request features. Again, this may be referred to as upsampling.

The combined packet 540 is split or divided for distribution as separate packets 550, 560 or at least for separate distributions to the respective applications of the one or more local devices 34. For the transmission, the gateway apparatus 330 includes third and fourth ports 381, 382. The output ports 381, 382 in various embodiments includes hardware and supporting software, or is connected to any suitable hardware and software—such as of a host USB device or of the vehicle 10—and such combination may be referred to collectively as the output port or ports, respectively. The third and fourth ports 381, 382 may be a single port performing both sets of functions. The ports may include at least one wire-based and/or wireless-based transceiver, having, for wireless communications, short-, medium-, and/or long-range capabilities. And the input and output ports may include the same or overlapping components, as would be the case in a transceiver arrangement shared by the input and output functions.

The separate packets 550, 560 include components corresponding to those of the combined packet 540, for meeting the original requests 510, 520. For instance, vehicle data item 542 of the combined packet is provided via vehicle data item 552 and vehicle data item 562 to the respective apps, for responding to the respective requests of 512 and 522. Vehicle data item 544 of the combined packet is provided via vehicle data item 554 and vehicle data item 564 to the respective apps, for responding to the respective requests of 514 and 524, and so on.

In various embodiments, then, the arrangement provides an effective and efficient manner of satisfying data needs of multiple requesting applications with a single data 540 set.

VI. Additional Structure, Algorithm Features, And Operations, And Select Advantages In combination with, or in the stead of, any of the other embodiments described herein, the present technology can include any structure or perform any functions as follows.

Many of the benefits and advantages of the present technology are described above. The present section restates some of those and references some others. The benefits described are not exhaustive of the benefits of the present technology.

The technology in various embodiments includes a middleware or gateway apparatus allowing selective disclosure of vehicle data to a mobile or local device, such as a mobile phone, OBD, or USB device.

The vehicle data in various embodiments includes that which can be referred to as native data, typically kept confidential at the vehicle. The vehicle data may include data from inherent vehicle sensors, after-market sensors, or other devices, such as a navigation unit at the vehicle.

The technology allows vehicle makers or users to obtain and use vehicle data, sharing it selectively with user mobile devices. The selective sharing is performed in response to local-device request, and when deemed appropriate at the gateway according to gateway programming, which may include considerations including vehicle needs, for instance. The selecting sharing also in various embodiments includes determining access or authority credentials for the requesting device or application, and upfront and/or dynamically confirming whether quality of data requested can be provided.

The technology gives app designers for local devices greater ability to design apps for interacting with the vehicle. Added freedoms include the designers knowing that their apps can have access to heretofore generally unavailable vehicle data, in a controlled or limited manner. This expands the types of apps that can be created and functions possible for those and existing apps. For embodiments providing contextual vehicle data (reference contextual unit 370), app designers can know advantageously that their apps can rely on receiving contextual knowledge data, rather than just raw or base vehicle data, and so design their apps with less work and complexity.

VII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A gateway apparatus, for managing local-device access to vehicle data, comprising:
   an input/output component configured to receive requests for vehicle data from a local device, and send vehicle data to the local device;
   a hardware-based processing unit in communication with the input/output component;
   a non-transitory computer-readable storage device in communication with the hardware-based processing unit and comprising an access unit, a control unit, and a data unit, wherein:
   the access unit comprises access-unit code that, when executed by the hardware-based processing unit, receives, by way of the input/output component, a request for the vehicle data from the local device and determines whether the gateway apparatus may satisfy the request;

the control unit comprises control-unit code that, when executed by the hardware-based processing unit, determines, in response to the access unit determining that the gateway apparatus may satisfy the request, what vehicle data will be provided to the local device;

the data unit comprises data-unit code that, when executed by the hardware-based processing unit, prepares the vehicle data to be provided to the local device by way of the input/output component, and sends the vehicle data to the local device by way of the input/output component;

the control-unit code comprises data-quality-decision-module code that, when executed by the hardware-based processing unit, determines quality for the vehicle data to be provided to the local device;

the quality indicates a resolution of the vehicle data to be provided to the local device; and the vehicle data is up-sampled by the data-quality-decision-module code, when executed to determine the quality for the vehicle data to be provided to the local device, to provide a higher quality of vehicle data, in one or more ways, than the vehicle data requested by the local device.

2. The gateway apparatus of claim 1, wherein:
the access-unit code, when executed by the hardware-based processing unit, receives, by way of the input/output component and from a remote source, business-logic instructions; and
the control-unit code, when executed by the hardware-based processing unit, uses the business-logic instructions in determining the vehicle data to be provided to the local device.

3. The gateway apparatus of claim 1, wherein the control-unit code comprises data-category-filter code that, when executed by the hardware-based processing unit, determines the vehicle data will be provided to the local device based on one or more factors selected from a group consisting of (i) a limit on what can be provided by the vehicle and (ii) information authorized to be provided by the gateway apparatus to the local device.

4. The gateway apparatus of claim 1, wherein the control-unit code comprises a data-format-decision-module code that, when executed by the hardware-based processing unit, determines a format for vehicle data to be provided to the local device for responding to the request.

5. The gateway apparatus of claim 4, wherein the format for vehicle data determined includes a contextual format generated based on raw vehicle data.

6. The gateway apparatus of claim 4, wherein the format for vehicle data determined includes a substantially non-processed form of raw vehicle data.

7. The gateway apparatus of claim 1, wherein the quality further indicates one or more of:
a frequency by which the vehicle data will be provided to the local device;
an accuracy of the vehicle data to be provided to the local device;
a volume of the vehicle data to be provided to the local device;
a quality of service for the vehicle data to be provided to the local device;
a latency with which the vehicle data will be provided to the local device;
a throughput by which the vehicle data will be provided to the local device;
level of the vehicle data, in the form of raw vehicle data, to be provided to the local device; and
level of the vehicle data, in the form of contextual vehicle data, to be provided to the local device.

8. The gateway apparatus of claim 1, wherein other vehicle data is down-sampled by the data-quality-decision-module code, when executed to determine the quality for the other vehicle data to be provided to the local device, to provide a lower quality of vehicle data, in one or more ways, than the other vehicle data requested by the local device.

9. The gateway apparatus of claim 8, wherein the down-sampling is performed in response to determining at least on factor selected from a group consisting of:
(i) a limit on what can be provided by the vehicle; and
(ii) a limit on quality authorized to be provided to the local device.

10. The gateway apparatus of claim 1, wherein:
the local device is a first local device;
said request is a first request corresponding to a first application operating at the local device;
the control-unit code, when executed by the hardware-based processing unit, receives a second request corresponding to a second application operating at the first local device or at another local device; and
the control-unit code, when executed by the hardware-based processing unit, merges the first request and the second request, yielding a merged request.

11. The gateway apparatus of claim 10, wherein the data-unit code, when executed by the hardware-based processing unit:
prepares a combined vehicle data file comprising vehicle data for satisfying both the first request and the second request;
splits the combined vehicle data file into a first vehicle data file, corresponding to the first request, for meeting first vehicle-data needs of the first application, and a second vehicle data file, corresponding to the second request, for meeting second vehicle-data needs of the second application; and
in sending the data to the local device by way of the input/output component, sends, by way of the input/output component, the first vehicle data file to the first local device for use by the first application, and the second vehicle data file for use by the second application.

12. The gateway apparatus of claim 10, wherein:
the data-quality-decision-module code, when executed by the hardware-based processing unit, determines data quality for vehicle data to be used to satisfy first vehicle-data needs, of the first application, and second vehicle-data needs, of the second application;
the first request includes request for vehicle data of a first type at a first quality;
the second request includes request for vehicle data of the first type at a second quality; and
the data-quality-decision-module code determines, when executed by the hardware-based processing unit, to upsample regarding the first request, corresponding to the first application, determining to provide higher-quality vehicle data than requested in the first request, in response to the second quality being higher than the first quality.

13. A gateway apparatus, for managing local-device access to vehicle data, comprising:
a non-transitory computer-readable storage device;

an access unit comprising access-unit code positioned at the non-transitory computer-readable storage device, wherein the access-unit code, when executed by a hardware-based processing unit, receives, by way of an input/output component, a request for the vehicle data from a local device and determines whether the gateway apparatus may satisfy the request;

a control unit, comprising control-unit code positioned at the non-transitory computer-readable storage device, wherein the control-unit code, when executed by the hardware-based processing unit, determines, in response to the access unit determining that the gateway apparatus may satisfy the request, what vehicle data will be provided to the local device; and a data unit, comprising data-unit code positioned at the non-transitory computer-readable storage device, wherein the data-unit code, when executed by the hardware-based processing unit, prepares the vehicle data to be provided to the local device by way of the input/output component, and sends the vehicle data to the local device by way of the input/output component;

wherein the local device is a first local device;

the request is a first request corresponding to a first application operating at the first local device;

the control-unit code, when executed by the hardware-based processing unit, receives a second request corresponding to a second application operating at the first local device or at another local device;

the control-unit code, when executed by the hardware-based processing unit, merges the first request and the second request, yielding a merged request; and the data-unit code, when executed by the hardware-based processing unit:
  prepares a combined vehicle data file comprising vehicle data for satisfying both the first request and the second request, wherein the combined vehicle data file is constructed based on the merged request;
  splits the combined vehicle data file into a first vehicle data file, corresponding to the first request, for meeting first vehicle-data needs of the first application, and a second vehicle data file, corresponding to the second request, for meeting second vehicle-data needs of the second application; and
  in sending the data to the local device by way of the input/output component, sends, by way of the input/output component, the first vehicle data file to the first local device for use by the first application, and the second vehicle data file for use by the second application.

14. The gateway apparatus of claim 13, wherein:
the access-unit code, when executed by the hardware-based processing unit, receives, by way of the input/output component and from a remote source, business-logic instructions; and
the control-unit code, when executed by the hardware-based processing unit, uses the business-logic instructions in determining the vehicle data to be provided to the local device.

15. The gateway apparatus of claim 13, wherein the control-unit code comprises one or more sets of code selected from a group consisting of:
  data-category-filter code that, when executed by the hardware-based processing unit, determines the vehicle data will be provided to the local device based on one or more factors selected from a group consisting of (i) a limit on what can be provided by the vehicle and (ii) information authorized to be provided by the gateway apparatus to the local device;
  data-format-decision-module code that, when executed by the hardware-based processing unit, determines a format for vehicle data to be provided to the local device for responding to the request; and
  data-quality-decision-module code that, when executed by the hardware-based processing unit, determines quality for the vehicle data to be provided to the local device.

16. The gateway apparatus of claim 15, wherein the format for vehicle data determined includes one or both of:
  a contextual format generated based on raw vehicle data; and
  a substantially non-processed form of raw vehicle data.

17. A process, performed using a gateway apparatus, for managing local-device access to vehicle data, comprising:
  receiving, by a hardware-based processing unit executing access-unit code positioned at a non-transitory computer-readable storage device, and by way of a tangible input/output component, a request for the vehicle data from a local device;
  determining, by the hardware-based processing unit executing the access-unit code, whether the gateway apparatus may satisfy the request;
  determining, by the hardware-based processing unit executing control-unit code positioned at the non-transitory computer-readable storage device, and in response to the processing unit determining that the gateway apparatus may satisfy the request, what vehicle data will be provided to the local device;
  determining quality for the vehicle data to be provided to the local device based on the request, wherein the quality indicates a resolution of the vehicle data to be provided to the local device;
  determining to up-sample the vehicle data to be provided to the local device;
  preparing, by the hardware-based processing unit executing data-unit code positioned at the non-transitory computer-readable storage device, the vehicle data to be provided to the local device by way of an input/output component, wherein the vehicle data to be provided to the local device is up-sampled to provide a higher quality of vehicle data, in one or more ways, than the vehicle data requested by the local device; and
  sending, by the hardware-based processing unit executing the data-unit code, the vehicle data to the local device by way of the input/output component.

* * * * *